(12) United States Patent
Johansen

(10) Patent No.: US 6,913,224 B2
(45) Date of Patent: Jul. 5, 2005

(54) METHOD AND SYSTEM FOR ACCELERATING AN OBJECT

(76) Inventor: Dana R. Johansen, 2601 Wagon Dr., Alexandria, VA (US) 22303

(*) Notice: Subject to any disclaimer, the term of this patent is extended or adjusted under 35 U.S.C. 154(b) by 0 days.

(21) Appl. No.: 10/671,684

(22) Filed: Sep. 29, 2003

(65) Prior Publication Data

US 2005/0067524 A1 Mar. 31, 2005

(51) Int. Cl.[7] ............................. B64D 3/00; B64G 1/12
(52) U.S. Cl. .................... 244/3; 244/1 TD; 244/158.2; 244/158.5
(58) Field of Search ........................ 244/1 TD, 3, 62, 244/63, 158 R, 172

(56) References Cited

U.S. PATENT DOCUMENTS

| | | | |
|---|---|---|---|
| 2,388,013 A | * 10/1945 | Rasor | 244/3 |
| 2,400,400 A | * 5/1946 | Van Buren Duer | 244/3 |
| 2,649,262 A | * 8/1953 | Fahrney | 244/3 |
| 3,415,520 A | 12/1968 | Woodward | 273/360 |
| 4,354,419 A | * 10/1982 | Patterson | 89/1.11 |
| 4,580,747 A | * 4/1986 | Pearson | 244/164 |
| 5,088,663 A | 2/1992 | Henson | 244/137.4 |
| 5,626,310 A | 5/1997 | Kelly | 244/2 |
| 5,678,784 A | 10/1997 | Marshall, Jr. | 244/2 |
| 6,029,928 A | 2/2000 | Kelly | 244/2 |

OTHER PUBLICATIONS

Bogar, Thomas J., "Hypersonic Airplane Space Tether Orbital Launch System (HASTOL) System: Interim Study Results"; 9th International Space Planes and Hypersonic Systems and Technologies Conference; Nov. 1–5, 1999, Norfolk, VA.
"Kite Physics 101" http://seattleairgear.com/kp101.htm.
"Kitte Physics 102" http://seattleairgear.com/kp102.htm.

\* cited by examiner

Primary Examiner—Robert P. Swiatek
(74) Attorney, Agent, or Firm—Birch, Stewart, Kolasch & Birch, LLP (57) ABSTRACT

A system for accelerating an object that includes a towing vehicle, a tether connected to the towing vehicle, an object having at least one airfoil connected to the tether and a controller for controlling movement of the object, wherein, the towing vehicle moves in a first direction at a first speed pulling the object in the first direction and the controller controls movement of the object to move the object at an angle to the first direction and accelerate the object to a speed substantially greater than the first speed.

27 Claims, 7 Drawing Sheets

METHOD AND SYSTEM FOR ACCELERATING AN OBJECT

FIELD OF THE INVENTION

The present invention is directed toward a method and system for accelerating an object, and, more specifically, toward a method and system for accelerating an object pulled by a towing vehicle by maneuvering the object relative to the direction of travel of the towing vehicle to accelerate the towed object to a speed substantially greater than the speed of the towing vehicle.

BACKGROUND OF THE INVENTION

It is often desirable to accelerate an object to a high speed. For example, in order to launch an object into orbit around the Earth or to send an object into interplanetary space, the object must accelerated sufficiently to overcome the force of Earth's gravity. The velocity at which an object must travel to escape the gravitational pull of a body is referred to as "escape velocity." For the Earth, escape velocity is about 25,000 mph. In order to place an object into orbit around the Earth, the object must be accelerated so that the pull of the Earth's gravity is balanced by the inertia of the object. Orbital velocity varies with the distance of the object from the Earth. At a typical space shuttle orbital altitude of 200 miles, orbital velocity is about 17,000 mph. It may also be desirable to accelerate an object to a lower, but still substantial speed, greater than Mach 3, for example, prior to launching the object into space or for other, unrelated reasons.

To date, the only practicable mechanism for accelerating an object to orbital or escape velocity has been the rocket. Rockets are expensive. The cost of many rocket launches is in the 50 to 100 million dollar range. The National Aeronautics and Space Administration (NASA) estimates that a typical space shuttle launch costs over 450 million dollars. Rocket engines are also dangerous, as shown by the numerous failures during the history of rocketry. Rockets may also be difficult to control once ignited. While liquid fueled rockets offer users some ability to control thrust, more powerful solid fuel rocket engines generally burn until the fuel source is depleted, with little opportunity to vary thrust and/or abort a launch. The cost and danger of using rocket engines has thus limited the number and type of outer space-related projects that are undertaken.

Beneficially, rockets carry their own source of oxygen and can thus burn and provide thrust under conditions where other propulsion systems, such as jet engines, can not operate, such as in the near vacuum of outer space. However, jet engines are routinely used at altitudes of 50,000 feet and higher. It has therefore been suggested that a rocket be carried to such an altitude by a large jet aircraft and launched into orbit from that altitude. Jet fuel rather than rocket fuel is thus used to impart an initial velocity and altitude to the object. While this method provides some benefits, a substantial amount of rocket fuel is still required to lift the object from 50,000 feet to a desired orbital altitude. In addition, there are other costs associated with operating and maintaining aircraft capable of carrying a rocket to a desired altitude. Thus the reduction in rocket-related costs associated with launching from a high altitude is often offset by the cost of lifting the rocket to that high altitude in the first place. Such systems might be economically feasible if used very frequently, daily, for example; however the demand for such frequent launches does not as yet appear to exist.

Other, more exotic devices for placing objects into orbit have also been suggested, one of which is the space tether. A space tether comprises a massive anchor that orbits around the Earth and an extremely long tether extending therefrom. The anchor rotates as it orbits, and the tether projects radially from the rotating anchor and is held taut by centrifugal force. The free end of the tether traces out a generally circular path. The anchor is positioned so that the circular path intersects the Earth's atmosphere, and the free end of the tether periodically moves through Earth's atmosphere. Objects can be placed into outer space using this system by accelerating them to the speed of the tether through the atmosphere, generally about Mach 12, attaching them to the tether, and allowing the inertia of the rotating tether to carry them into space where they are released.

Tethers 250 to 1000 miles long can be made using produces available today. Information on space tethers can be found in the documents entitled "AIAA-99-4802 Hypersonic Airplane Space Tether Orbital Launch (HASTOL) System: Interim Study Results" by Bogar, et. al., presented at the $9_{th}$ International Space Planes and Hypersonic Systems and Technologies Conference 1–5 Nov. 1999, Norfolk, Va, which is hereby incorporated herein by reference. A significant problem with using such tethers, however, is the difficulty involved in accelerating objects to the Mach 12 or so required to match the speed of the tether.

It is therefore desirable to provide a method and system for accelerating an object to a high velocity in an efficient manner.

SUMMARY OF THE INVENTION

The problem of accelerating an object to a sizable fraction of orbital velocity is addressed by the present invention which comprises, in a first aspect, a method of accelerating an object through an atmosphere which involves providing a towing vehicle, connecting a tether to the towing vehicle, attaching an object comprising an airfoil to the tether, and moving the towing vehicle at a first speed in a first direction. The airfoil is controlled to fly the object at a non-zero angle to the first direction in order to accelerate the object.

Another aspect of the invention comprises a system for accelerating an object which system includes a towing vehicle, a tether connected to the towing vehicle, an object comprising at least one airfoil connected to the tether, and a controller for controlling movement of the object. The towing vehicle moves in a first direction at a first speed to pull the object in the first direction, and the controller controls movement of the object to move the object at an angle to the first direction and accelerate the object to a speed substantially greater than the first speed.

Another aspect of the invention comprises a system for accelerating an object that includes a towing vehicle, a towed vehicle comprising at least one wing adapted to generate sufficient lift to support the towed vehicle in flight, a controller for controlling movement of the towed vehicle, and a tether at least 50 miles long adapted to connect the towing vehicle to the towed vehicle.

A further aspect of the invention comprises a system for accelerating an object that includes a towing vehicle and a tether at least 50 miles long connected to the towing vehicle and adapted to retain a launch vehicle accelerating under at least two gravities.

Another aspect of the invention comprises a system for accelerating an object that includes a towing mechanism, a maneuverable object including at least one airfoil, an adjustable connecting mechanism for connecting the towing mechanism and the maneuverable object, a first control mechanism for controlling movement of the maneuverable object and a second control mechanism for controlling the length of the adjustable connector. The towing mechanism moves in a first direction at a first speed pulling the object in the first direction and the first control mechanism maneuvers the object to move the object at an angle to the first direction and accelerate the object to a speed substantially greater than the first speed.

Yet another aspect of the invention comprises a system for accelerating an object that includes a first towing vehicle and a second towing vehicle connected to the first towing vehicle by a first length of tether. A second length of tether connects an object comprising at least one airfoil to the second towing vehicle. A controller is also provided for controlling movement of the at least one second towing vehicle and the object.

In another aspect, the invention comprises a method of accelerating an object through an atmosphere that involves providing a towing vehicle and connecting a tether to the towing vehicle. First and second objects comprising an airfoil are attached to the tether, and the towing vehicle is moved at a first speed in a first direction. The first object is flown in a second direction at an angle to the first direction to accelerate the first object and the second object is flown in a third direction at an angle to the second direction to accelerate the second object.

BRIEF DESCRIPTION OF THE DRAWINGS

The above aspects of the invention and others will be better appreciated after a reading and understanding of the detailed description of the invention that appears below together with the following drawings wherein.

DETAILED DESCRIPTION OF THE INVENTION

Figure 1:
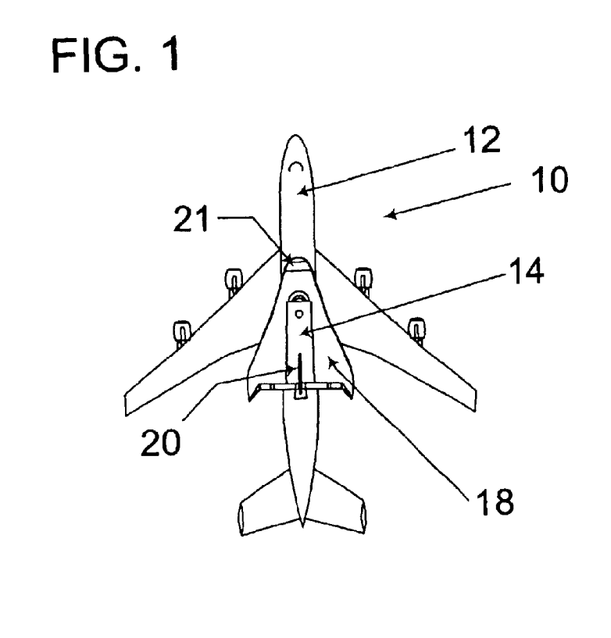
FIG. 1 is top plan view of a launch system according to the present invention comprising a launch vehicle attached to a towing vehicle.

Referring now to the drawings, wherein the showings are for purposes of illustrating preferred embodiments of the invention only, and not for the purpose of limiting same, FIG. 1 shows a launch system according to the present invention, designated generally 10, comprising a towing vehicle 12, sometimes referred to herein as an aircraft, and a towed object 14, sometime referred to herein as a launch vehicle, connected to one another by a tether 16, shown in FIGS. 2 through 6. The towing vehicle may, for example, be a Boeing 747or other large aircraft capable of carrying a launch vehicle to an altitude of 35,000 feet, for example, with sufficient power to pull the launch vehicle forward while the launch vehicle maneuvers to build up speed as described hereinafter.

The towing vehicle may alternately be a rocket, or a ground based system, or any other device capable of towing an object along at the end of a tether as described hereinafter. However, it is presently envisioned that an aircraft will be used for this purpose. Moreover, while object 14 is shown mounted on top of towing vehicle 12, it may just as readily be slung beneath the aircraft, pulled behind the towing vehicle on a short line (as is presently done when launching a glider), or even attached to a line extending from the towing vehicle after the towing vehicle is airborne.

Figure 2:
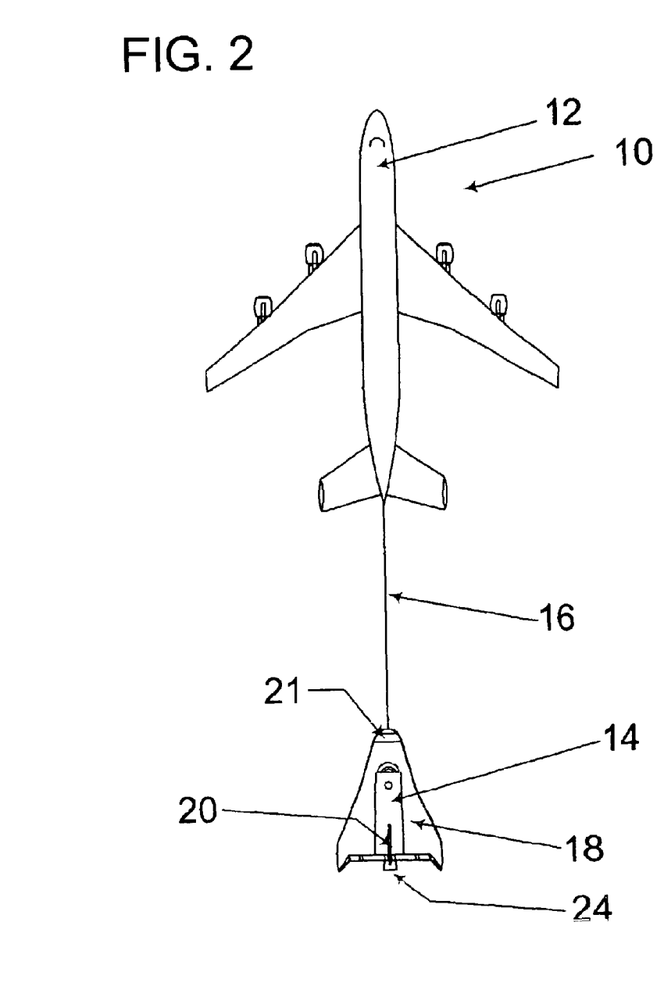
FIG. 2 is a top plan view of the launch system of FIG. 1 showing the launch vehicle separated from the towing vehicle and a tether connected between the towing vehicle and launch vehicle.

Once the towing vehicle reaches an appropriate cruising altitude and velocity, 35,000 feet and Mach 0.8, for example, launch vehicle 14 is released from towing vehicle 12, and tether 16 is paid out from towing vehicle 12. Launch vehicle 14 include an airfoil, such as wing 18, that generates sufficient lift to keep launch vehicle 14 aloft at an altitude approximately the same as or somewhat higher than the altitude of towing vehicle 12 while launch vehicle 14 is towed by towing vehicle 12. Launch vehicle 12 preferably also includes a movable control surface, such as rudder 20 and/or wing flaps (not shown) and a controller 21 to allow the towed vehicle to be maneuvered in a manner similar to a powered aircraft, independently of the direction of towing vehicle 12. Controller 21 may comprise a microprocessor on board launch vehicle 14, similar to an aircraft autopilot, which microprocessor may optionally receive input from human pilots on launch vehicle 14. Alternately, controller 21 may include ground-based elements, not shown, or elements, not shown, carried aboard towing vehicle 12 that communicate remotely with controller 21 on the launch vehicle.

Towing vehicle 12 flies along a generally linear flight line 22 while deploying and launching launch vehicle 14, and the direction of movement of towing vehicle 12 along flight line 22 during this process may be referred to herein as "forward." The direction of flight line 22 will be approximately perpendicular to the direction in which launch vehicle 12 is traveling when released. Thus, an easterly release, desirable for placing an object into orbit, would require towing vehicle 12 to fly approximately due north or due south.

Tether 16 is paid out until launch vehicle 14 trails tow vehicle 12 by an appropriate distance. The distance is based on the velocity to be imparted to the launch vehicle 14 and the acceleration to which the launch vehicle 14 may safely be subjected. The distance separating launch vehicle 14 from towing vehicle 12 will affect the amount of centripetal force experienced by launch vehicle 14 and its payload, human or otherwise, according to the equation $a=v^2/R$, where "a" equals acceleration, "v" equals the velocity of the launch vehicle, and "R" equals the length of tether 16. In order to accelerate the launch vehicle to a speed of Mach 6, for example, while limiting acceleration experienced by launch vehicle 14 to three gees, tether 16 must be approximately 90 miles long. As is clear from the above equation, longer tethers will reduce the g-forces experienced by a launch vehicle, and/or allow for higher velocities to be obtained without increasing g-forces. Shorter tethers could be used for unmanned towed objects that can withstand higher g-forces.

Tether 16 must be made from a material sufficiently strong to withstand the forces produced by a launch vehicle experiencing, for example, three gees of acceleration plus the aerodynamic drag of pulling the launch vehicle through the air. For instance, deriving a design for a launch vehicle from the "Black Colt" portion of the article "Black Horse: One Stop to Orbit" by Robert M. Zubrin et. al. (*Analog Magazine*, June 1995), a vehicle capable of delivering 5000 pounds to Mach 12 (a speed high enough to reach a HASTOL tether) from an initial speed of Mach 6 would weigh about 31,000 pounds when released from tether 16 and have a plan form area of about 370 square feet. At three gravities of centripetal force, the vehicle would deliver 93,000 pounds of force to the tether. Treating the tow vehicle as a flat plate being dragged normal to the airflow produces a drag force of about 142,000 pounds on the tether. The combination of the above two forces is about 235,000 pounds. With a reasonable safety factor, the tether should be capable of supporting a load of about 350,000 pounds. Moreover, the tether material must be thin enough so that 90 miles or more can be wound on a reel carried by the tow vehicle. A suitable material is available from Honeywell International, Inc. under the trade name Spectra fiber 2000. Spectra fiber has an ultimate tensile strength of about 3.5 GPa (500 Ksi). Thus, a tether having a cross section of about 0.7 square inch would be needed to withstand the 350,000 pounds of force. If aerodynamic drag friction causes a temperature problem, various other materials, such as beta silicon carbide fibers, may also be suitable for this purpose.

Figure 3:
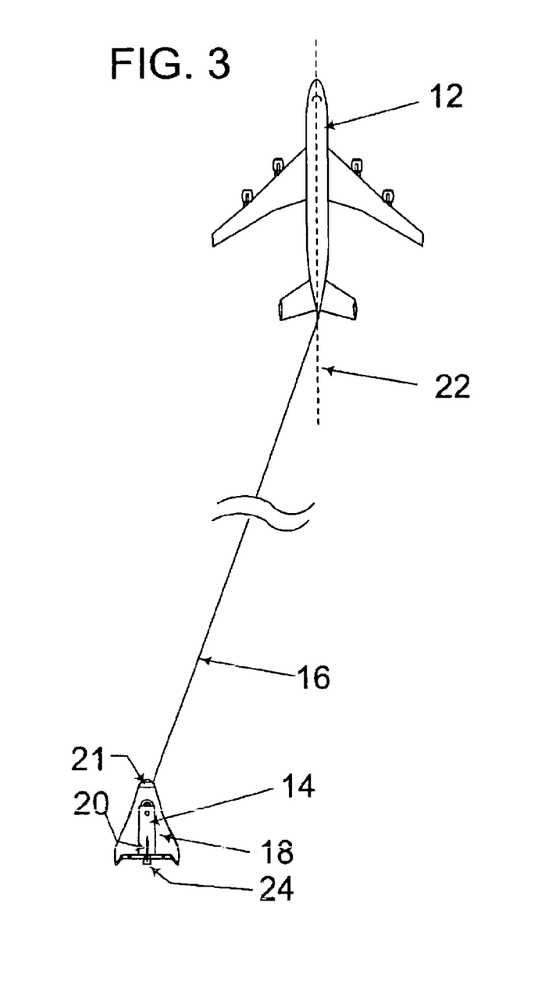
FIG. 3 is a top plan view of the launch system of FIG. 1 showing the launch vehicle trailing behind the towing vehicle while connected thereto by the tether and flying generally parallel to the flight line of the towing vehicle.

Referring now to FIG. 3, once a suitable length of tether has been paid out (or, alternately, while the tether is being paid out) from towing vehicle 12, launch vehicle 14 is maneuvered to a position to one side of the flight line 22 of the towing vehicle 12, preferably about 30 degrees from the flight line 22. Because drag constitutes the dominant force on the launch vehicle and decreases with altitude, launch vehicle 14 will also preferably be maneuvered to fly at a higher altitude than towing vehicle 12. While flying launch vehicle 14 at a higher altitude than towing vehicle 12 will reduce the L/D ratio somewhat, the lower drag at the higher altitude will more than compensate for this loss.

When an angular separation of about 30 degrees exists between the tether 16 and the flight line 22 of the towing vehicle, and a 90 mile tether is used, launch vehicle will be separated from the flight line by approximately 45 miles and will thus have available forty five miles over which to accelerate to a desired speed.

Figure 4:
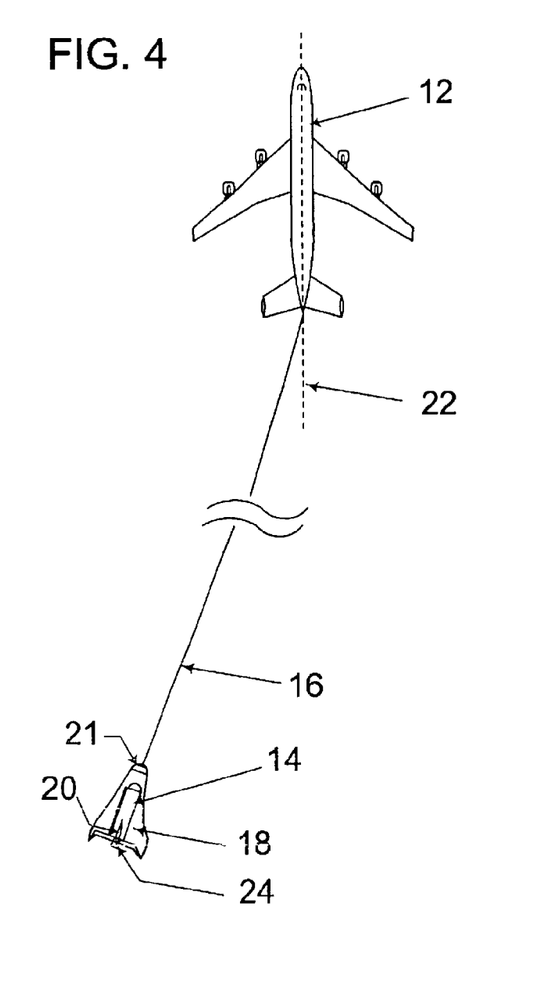
FIG. 4 is a top plan view of the launch system of the present invention showing the launch vehicle banking from the position shown in FIG. 3 toward the flight line of the towing vehicle.

As shown in FIG. 4, to begin its acceleration, launch vehicle 14 banks like an aircraft executing a turn and flies toward flight line 22. This banking increases the speed of launch vehicle 14, which increases the speed of air moving over wing 18 which in turn produces increased lift and further accelerates launch vehicle 14. Because the motion of launch vehicle 14 now has a sideways component relative to the forward direction of the tow vehicle, the wind impinging upon wing 18 will appear to come from an angle to flight line 22, and launch vehicle 14 therefore must maneuver to face into this apparent wind. Launch vehicle 14 is thus flown like a controllable kite using its aerodynamics to achieve a velocity significantly higher than the velocity of the towing vehicle.

Figure 5:
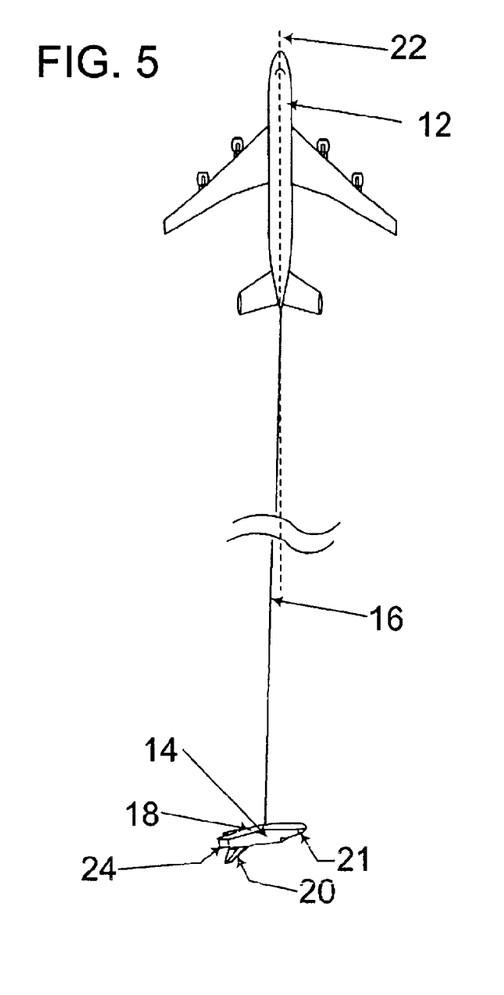
FIG. 5 is a top plan view of the launch system of the present invention showing the launch vehicle just before it reaches the flight line of the towing vehicle.

The velocity that can be obtained by launch vehicle 14 is approximately equal to the effective tow velocity of launch vehicle 14 multiplied by its lift-to-drag (L/D) ratio. The L/D ratio of a typical subsonic or supersonic launch vehicle would be in the range of 6 to 12. As the launch vehicle approaches the hypersonic regime, the L/D ratio decreases to about 4. A subsonic tow vehicle, such as a Boeing 747, can travel at approximately Mach 0.8. Therefore, launch vehicle 14 can be accelerated using the present method and system to a speed of Mach 5 to Mach 6. The velocity of launch vehicle 14 will be highest at a point near flight line 22, and this is ideally the point at which launch vehicle 14 will be released from tow vehicle 12. The velocity of launch vehicle 14 will preferably be substantially greater than the velocity of tow vehicle 16, at least double the speed of tow vehicle 16, for example.

Figure 6:
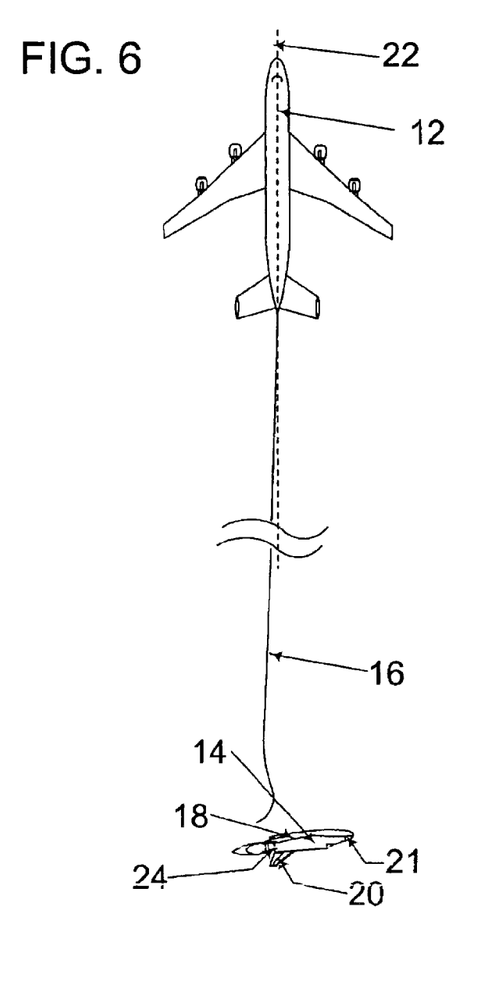
FIG. 6 is a top plan view of the launch vehicle after it has separated from the tether and the onboard propulsion system of the launch vehicle has been engaged.
Figure 7:
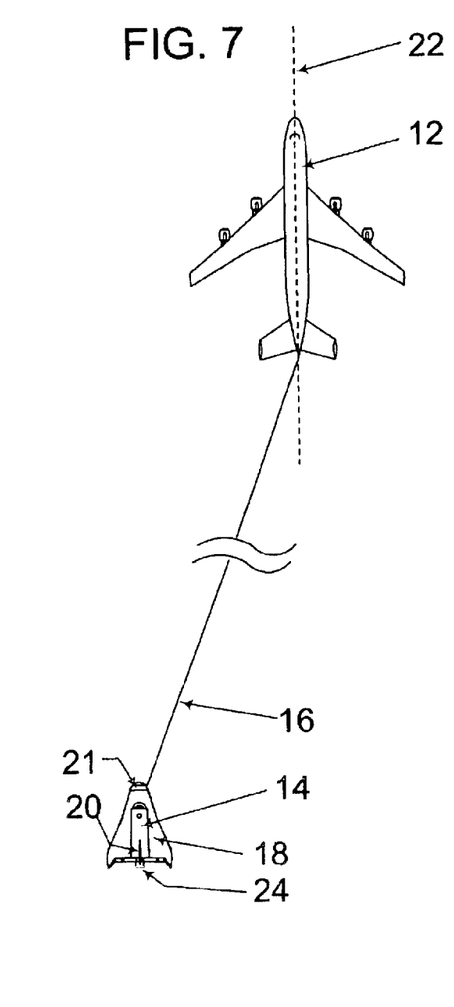
FIG. 7 is a top plan view of a second embodiment of a launch system according to the present invention showing a launch vehicle connected to a tether which is in turn connected to the towing vehicle by a retractable reel, the launch vehicle trailing behind the tow vehicle and flying generally parallel to the flight line of the towing vehicle.

FIG. 6 shows launch vehicle 14 after it has been released from tether 16 continuing on in a straight path at a high speed, approximately Mach 5 to Mach 6 in this example. The release may be effected through the use of a mechanical uncoupling of the tether and the launch vehicle, via explosive bolts (not shown), for example, or through a severing of the tether. The speed obtained by using the aerodynamic properties of the launch vehicle may be adequate for some purposes, such as high-speed intercontinental transport. However, in cases where placing launch vehicle 14 into orbit is desired, additional thrust must be provided to accelerate launch vehicle 14 to approximately Mach 24. This additional acceleration may be provided by an onboard propulsion device, such as a chemical rocket 24, shown ignited in FIG. 6. Because half the necessary acceleration needed for reaching orbit has been provided before the rocket ignites (and because the launch vehicle is now 35,000 feet or so above the ground) significantly less rocket fuel is required to accelerate launch vehicle 14 to orbital velocity.

Higher launch vehicle velocities can be obtained if a supersonic tow vehicle is used. However, because the lift-to-drag ratios of supersonic vehicles are generally lower than those of subsonic vehicles, this a system using a supersonic towing vehicle would be less efficient. Nonetheless, a Mach 3 tow vehicle would, for the reasons provided above, accelerate a towed vehicle having a L/D of 4 to approximately Mach 12, or about one-half of orbital velocity, without the use of a rocket. This velocity would be adequate to match the velocity of an orbiting space tether. Thus the combination of a supersonic towing vehicle, launch vehicle and space tether could place an object such as launch vehicle 14 into orbit without the use of rockets.

Figure 8:
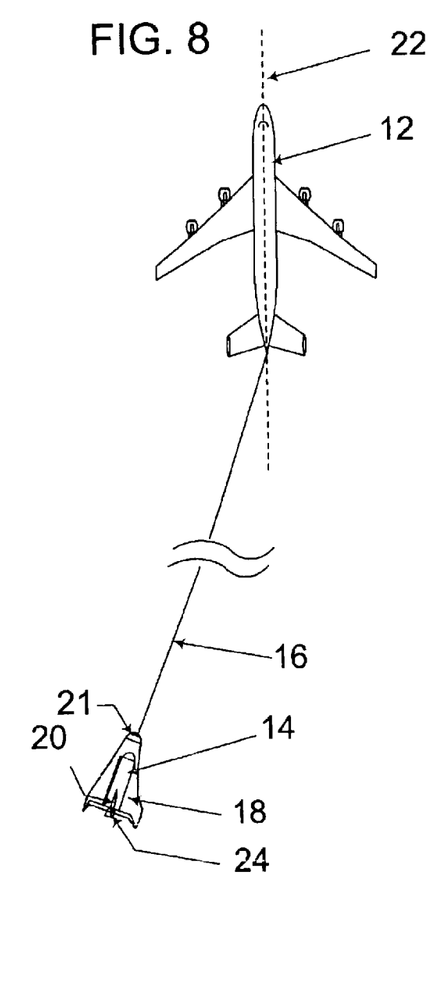
FIG. 8 is a top plan view of the launch system of FIG. 7 showing the launch vehicle banking toward the flight line of the towing vehicle while the tether is retracted by the reel.
Figure 9:
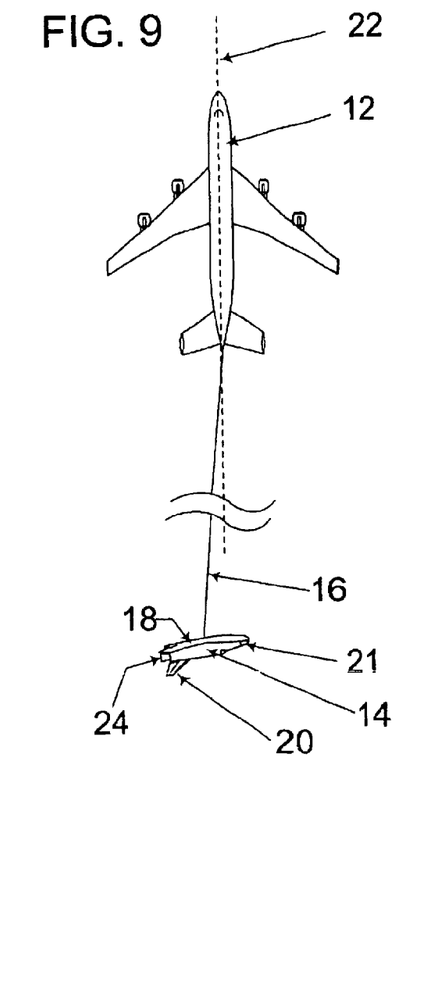
FIG. 9 is a top plan view of the launch system of FIG. 7 showing the launch vehicle just before it reaches the flight line of the towing vehicle as the reel continues to retract the tether.
Figure 10:
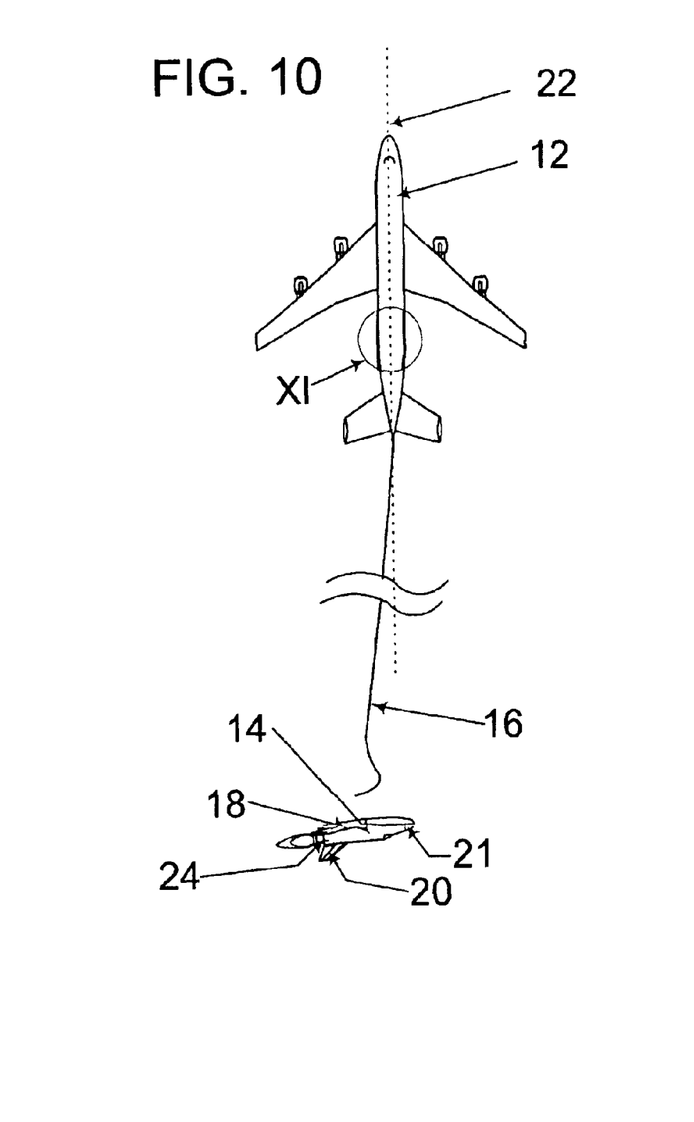
FIG. 10 is a top plan view of the launch system of FIG. 9 showing the launch vehicle after it has separated from the tether and the onboard propulsion system of the launch vehicle has been activated.
Figure 11:
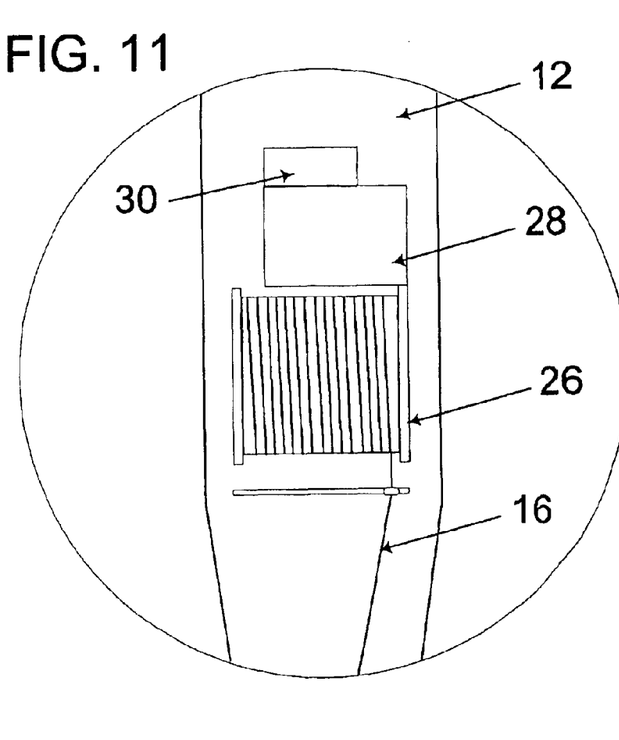
FIG. 11 is a sectional top plan view of detail XI of FIG. 10 schematically showing a reel mounted in the towing vehicle of FIG. 7 for retracting the tether.

The speed at which launch vehicle 14 moves when released from tether 16 depends on the effective tow velocity, that is, the velocity at which the tether is moving relative to the Earth. A second embodiment of the present invention, shown in FIGS. 6–11, wherein like reference numerals are used to identify elements common to the first embodiment, shows a system for increasing this effective tow velocity. In this embodiment, the tow velocity provided by the moving tow vehicle 12 is increased by rapidly retracting tether 16 using, for example, a reel 26 turned by drive 28 under the control of a controller 30 for regulating the speed at which the reel pays out or reels in tether 16 as shown in FIG. 11. In use, launch vehicle 14 is positioned at the end of tether 16 at a distance of approximately 90 miles from tow vehicle 12 in the same manner as described above in connection with the first embodiment. Launch vehicle 14 then banks and begins accelerating toward the flight line 22 of tow vehicle 12. However, as shown in FIG. 8, during this process tether 16 is rapidly retracted by reel 26 to increase the velocity of the launch vehicle relative to the air and the ground. If tether 16 is retracted so that it is pulling launch vehicle 14 toward towing vehicle 14 at a relative speed of Mach 3, and if tow vehicle 12 is itself moving forward along flight line 22 at Mach 3, the launch vehicle will be moving at a speed of Mach 6 with respect to the Earth. Multiplying Mach 6 by a hypersonic L/D ratio of 4 shows that launch vehicle 14 will be moving at Mach 24 or orbital velocity, when it is released from tow vehicle 12—without the use a rocket.

Figures 12, 13, 14:
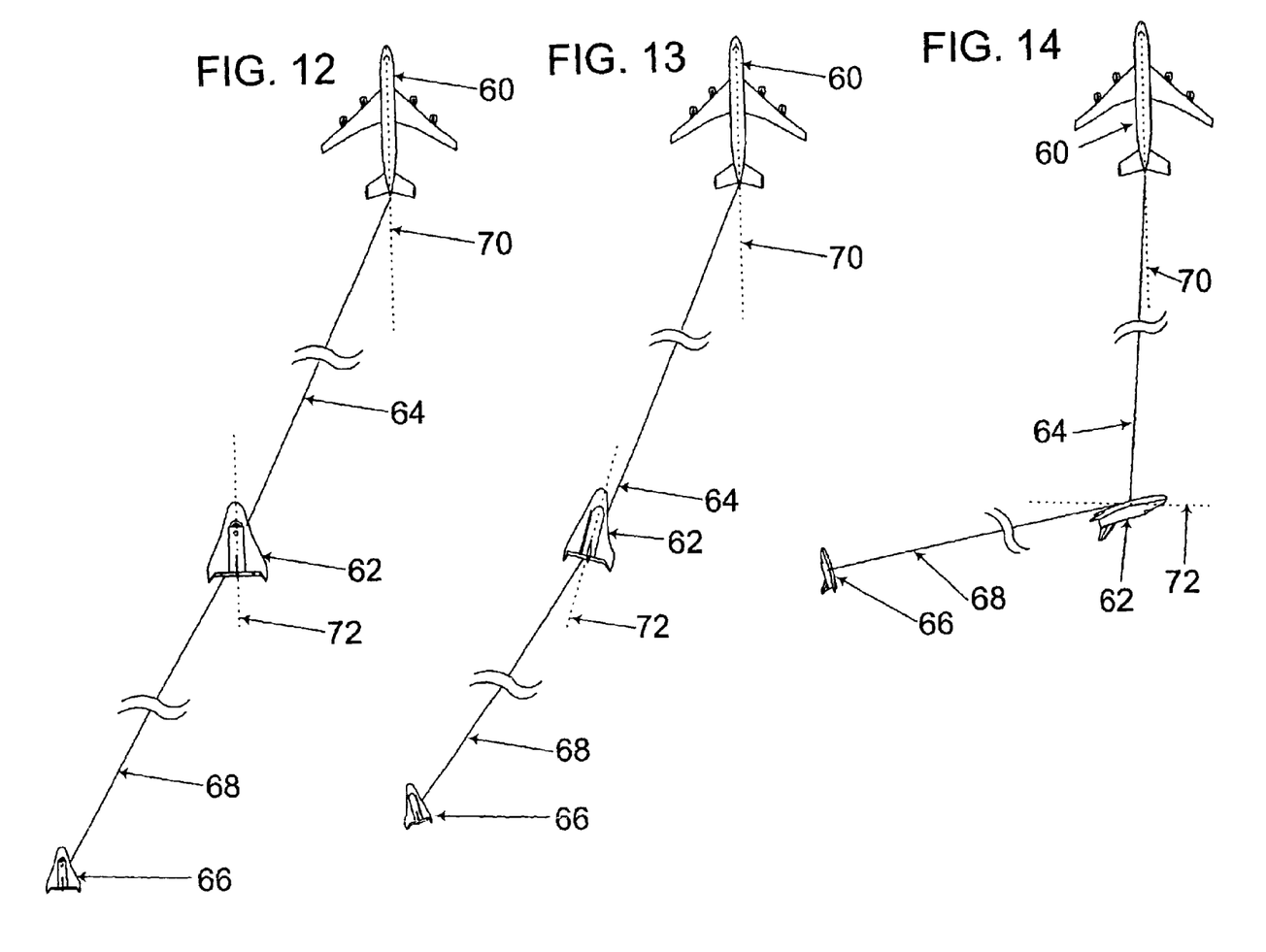
FIG. 12 is a top plan view of a third embodiment of a launch system according to the present invention showing a first towing vehicle, a second towing vehicle connected to the first towing vehicle by a tether and a launch vehicle attached to the second towing vehicle by a tether.
FIG. 13 is a top plan view of the launch system of FIG. 12 showing the second towing vehicle banking toward the flight line of the first towing vehicle and the launch vehicle banking away from the flight line of the first towing vehicle.
FIG. 14 is a top plan view of the launch system of FIG. 12 showing the second towing vehicle approaching the flight line of the first towing vehicle and the launch vehicle approaching the flight line of the second towing vehicle just prior to release.

A third embodiment of the invention is shown in FIGS. 12–14 in which like reference numerals are used to identify elements common to the first and second embodiments. In this embodiment, as best seen in FIG. 12, a first towing vehicle 60 pulls a second towing vehicle 62 using a first tether 64. Second towing vehicle 62, in turn, pulls a launch vehicle 66 using a second tether 68. (Alternately, the second towing 62 vehicle and the launch vehicle 66 could be connected to a single long tether extending from the first towing vehicle 60.) Initially, second towing vehicle 62 and launch vehicle 66 are generally aligned behind first towing vehicle 60 at an angle to the flight line 70 of first towing vehicle 60 at the same or a somewhat higher altitude than first towing vehicle 60.

With reference to FIG. 13, to accelerate launch vehicle 66, second towing vehicle 62 banks toward flight line 70 of first towing vehicle 60 while launch vehicle 66 banks away from the flight line 72 of first towing vehicle 60. In this manner, second towing vehicle 62 accelerates to a speed significantly higher than the speed of first towing vehicle 60 and becomes itself a high speed towing vehicle for launch vehicle 66. When second towing vehicle 62 approaches the flight line 70 of first towing vehicle 60, launch vehicle 66 approaches the flight line 72 of second towing vehicle 62. As discussed above, the velocity that can be attained by a towed vehicle is approximately equal to the effective tow velocity of the towed vehicle multiplied by its L/D ratio. Thus, if first towing vehicle 60 is a subsonic Boeing 747 traveling at Mach 0.8, it will impart a speed of about Mach 5 to second towing vehicle 62. Second towing vehicle 62 thus becomes a Mach 5 towing vehicle for launch vehicle 66. The L/D ratio of hypersonic vehicles drops to about 4. Thus launch vehicle 66 is accelerated to four times Mach 5 or Mach 20 before being released. This is nearly orbital velocity, and more than fast enough to allow the launch vehicle to mate with an orbiting tether such as the HASTOL discussed above. Retractable tethers could also be used on either or both first towing vehicle 60 and second towing vehicle 62 in order to further increase the release velocity of launch vehicle 66.

Figure 15:
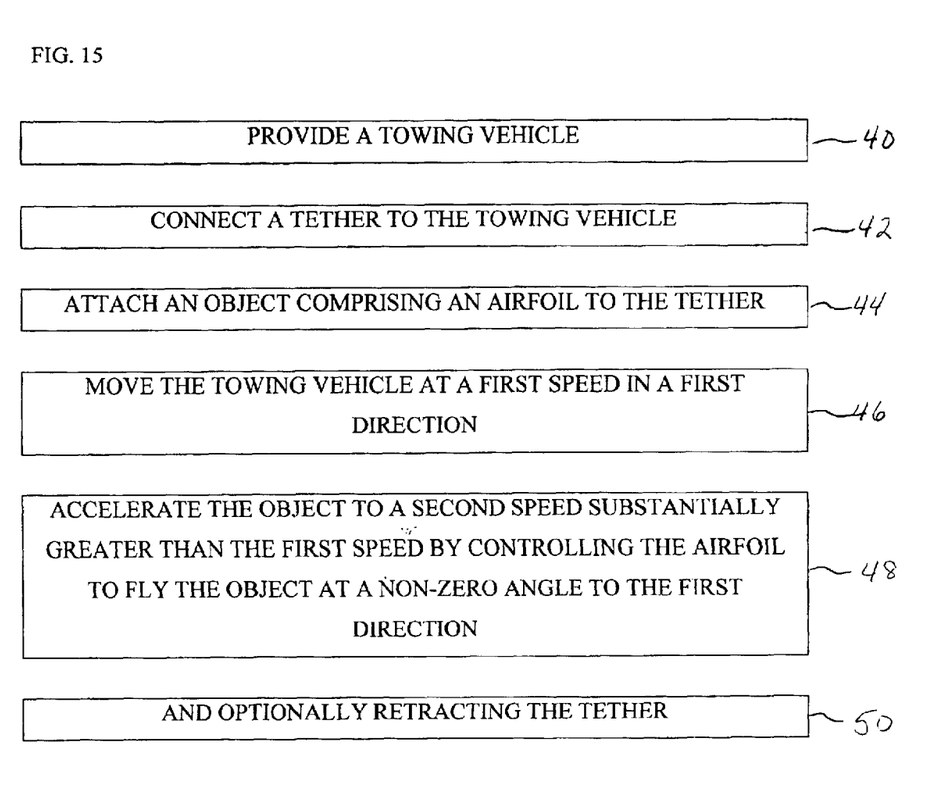
FIG. 15 is a flow chart listing the steps of carrying out an embodiment of the present invention.

FIG. 15 shows the steps involved in accelerating a launch vehicle according to a method of the present invention. At step 40 a towing vehicle is provided, and a tether is connected to the towing vehicle at step 42. Thereafter, an object that includes an airfoil is attached to the tether at step 44. The towing vehicle is moved in a first direction at a first speed at a step 46, and the object is accelerated to a second speed substantially greater than the first speed by controlling the airfoil to fly the object at a non-zero angle to the first direction at step 48. Optionally, the tether may be retracted into the towing vehicle during step 50 to increase the effective velocity of the towed vehicle.

The present invention has been described in terms of several preferred embodiments, it being understood that numerous obvious additions and modifications to these embodiments will become apparent to those skilled in the relevant arts upon a reading and understanding of the foregoing disclosure. For example, while the launch vehicle 14 is shown in the drawings as flying with its lower surface facing forward, this arrangement would cause passengers, in the case of a manned launch vehicle, to experience negative g-forces lifting them out of their seats. To address this problem, gimbaled seats could be provided to allow passengers to swivel and maintain an orientation in which they would experience positive g-forces. Alternately, the tether could be connected to the top surface of the launch vehicle and the wings designed to produce lift in this "upside down" configuration. In addition, it may sometimes be desirable to provide additional aerodynamic surfaces along the tether 16 between the towing vehicle and the launch vehicle to help the tether move smoothly through the air in a desired relationship to the tow vehicle 12. It is intended that all such obvious modifications and improvements be included within the coverage of this patent to the extent that they fall within the scope of the several claims appended hereto.

I claim:

1. A method of accelerating an object through an atmosphere comprising the steps of:
   providing a towing vehicle;
   connecting a tether to the towing vehicle;
   attaching an object comprising an airfoil to the tether;
   moving the towing vehicle at a first speed in a first direction; and
   accelerating the object to a second speed substantially greater than the first speed by controlling the airfoil to fly the object at a non-zero angle to the first direction.

2. The method of claim 1, wherein said step of accelerating the object to a second speed comprises the step of accelerating the object to at least double the first speed.

3. The method of claim 1, wherein said step of accelerating the object to a second speed comprises the step of accelerating the object to an orbital velocity.

4. The method of claim 1, wherein said step of accelerating the object to a second speed comprises the step of accelerating the object to an escape velocity.

5. The method of claim 1, including the additional step of releasing the object from the towing vehicle after the object is accelerated to the second speed.

6. The method of claim 5, wherein the step of releasing the object from the towing vehicle comprises the step of disconnecting the object from the tether.

7. The method of claim 5, including the additional step of accelerating the object to a third speed greater than the second speed after said step of releasing the object from the towing vehicle.

8. A system for accelerating an object comprising:
a towing vehicle moving in a first direction at a first speed;
a tether connected to said towing vehicle;
an object comprising at least one airfoil connected to said tether; and
a controller for accelerating said object to a speed substantially greater than said first speed by flying said object at an angle to said first direction.

9. The system of claim 8, wherein said towing vehicle comprises an airplane.

10. The system of claim 8, wherein said speed substantially greater than said first speed is adequate to place said object into orbit about the earth.

11. The system of claim 8, wherein said speed substantially greater than said first speed is greater than or equal to Earth's escape velocity.

12. The system of claim 8, wherein said speed substantially greater than said first speed is at least double said first speed.

13. The system of claim 8, wherein said object includes a propulsion system.

14. The system of claim 13, wherein said propulsion system comprises a rocket.

15. The system of claim 8, wherein said object comprises a body and said airfoil is attached to said body.

16. The system of claim 15, wherein said airfoil includes at least one movable surface.

17. The system of claim 16, wherein said controller controls the position of said at least one movable surface.

18. The system of claim 8, wherein said tether is retractably connected to said towing vehicle.

19. The system of claim 8, wherein said towing vehicle includes a reel and said tether is connected to said reel.

20. The system of claim 19, including a second controller for controlling the operation of said reel.

21. The system of claim 8, including at least one airfoil attached to said tether.

22. The system of claim 8, wherein said towing vehicle comprises a supersonic aircraft.

23. A system for accelerating an object comprising:
towing means;
a maneuverable object comprising at least one airfoil;
adjustable connector means for connecting said towing means and said maneuverable object;
first control means for controlling movement of said maneuverable object; and
second control means for controlling the length of said adjustable connector means;
wherein, said towing means moves in a first direction at a first speed pulling said object in said first direction and said first control means maneuvers said object to move said object at an angle to said first direction and accelerate said object to a speed substantially greater than said first speed.

24. The system of claim 23, including disconnecting means for disconnecting said maneuverable object from said towing means.

25. The system of claim 24, wherein said maneuverable object includes propulsion means independent of said towing means.

26. A system for accelerating an object comprising:
a first towing vehicle;
a first length of tether connected to said first towing vehicle;
at least one second towing vehicle connected to said first length of tether;
a second length of tether connected to said second towing vehicle wherein the sum of said first length and said second length is at least 50 miles;
an object comprising at least one airfoil connected to said second length of tether; and
at least one controller for controlling movement of said at least one second towing vehicle and said object.

27. A method of accelerating an object through an atmosphere comprising the steps of:
providing a towing vehicle;
connecting a tether to the towing vehicle;
attaching a first object comprising an airfoil to the tether;
attaching a second object comprising an airfoil to the tether;
moving the towing vehicle at a first speed in a first direction;
flying the first object to a first side of the towing vehicle at an angle to the first direction to accelerate the first object; and
while the first object is flying to the first side of the towing vehicle, flying the second object away from the first side of the towing vehicle at an angle to the first direction to accelerate the second object.

* * * * *